United States Patent

Okumoto et al.

[11] Patent Number: 5,416,968
[45] Date of Patent: May 23, 1995

[54] METAL MOLD FOR PRODUCING WOOD GOLF CLUB HEAD AND METHOD OF PRODUCING THE CLUB HEAD

[75] Inventors: Takaharu Okumoto, Chigasaki; Masahiro Kato, Zama, both of Japan

[73] Assignee: The Yokohama Rubber Co., Ltd., Tokyo, Japan

[21] Appl. No.: 273,145

[22] Filed: Jul. 14, 1994

Related U.S. Application Data

[63] Continuation of Ser. No. 21,229, Feb. 23, 1993, abandoned.

[30] Foreign Application Priority Data

Feb. 26, 1992 [JP] Japan .................. 4-039530

[51] Int. Cl.⁶ ............... B29C 43/36; B29C 43/50; A63B 53/04
[52] U.S. Cl. .................. 29/527.1; 29/530; 264/154; 264/257; 273/80.2; 273/167 R; 425/395; 425/412; 425/444
[58] Field of Search .............. 249/64; 264/154, 155, 264/219, 257, 325; 273/80.2, 167 R; 425/394, 398, 412, 414, 444, 457, 468, 577, 395, 408; 29/527.1, 530

[56] References Cited

U.S. PATENT DOCUMENTS

| | | | |
|---|---|---|---|
| 3,571,900 | 3/1971 | Hardesty | 425/577 |
| 3,843,122 | 10/1974 | Florian | 273/167 R |
| 4,581,190 | 4/1986 | Nagamoto et al. | 264/257 |
| 4,874,171 | 10/1989 | Ezaki et al. | 273/167 H |

FOREIGN PATENT DOCUMENTS

| | | | |
|---|---|---|---|
| 57-87919 | 6/1982 | Japan | 264/155 |
| 2212406 | 7/1989 | United Kingdom | 273/167 R |

*Primary Examiner*—Jay H. Woo
*Assistant Examiner*—Robert B. Davis
*Attorney, Agent, or Firm*—Finnegan, Henderson, Farabow, Garrett & Dunner

[57] ABSTRACT

A metal mold for producing a wood type golf club head, including an upper metal mold member having a molding recess including a surface for molding an upper end portion of a shaft bore in a club head, a lower metal mold member having a molding recess including a surface for molding a sole of the club head, a shaft bore molding upper pin fitted firmly in the portion of the surface of the upper metal mold member which corresponds to an upper end portion of the shaft bore, so as to project to the inner side of the metal mold, and a shaft bore-molding lower pin fitted firmly in the lower metal mold member so as to project to the inner side of the metal mold, the upper and lower pins being arranged coaxially in an opposed state via a narrow clearance, the direction in which the upper and lower pins are arranged crossing perpendicularly the direction in which the joint surfaces of the upper and lower metal mold members extend.

6 Claims, 4 Drawing Sheets

5,416,968

METAL MOLD FOR PRODUCING WOOD GOLF CLUB HEAD AND METHOD OF PRODUCING THE CLUB HEAD

This application is a continuation of application Ser. No. 08/021,229 filed Feb. 23, 1993, now abandoned.

BACKGROUND OF THE INVENTION

This invention relates to a metal mold for producing a wood type golf club head, and more particularly to a metal mold for producing a wood type golf club head which enables a molded product to be removed therefrom easily, and the shaft bore molding accuracy to be improved.

In general, there are two types of well-known metal molds, which are shown in FIGS. 7 and 8, for producing wood type golf club heads out of a raw material, such as a fiber-reinforced plastic. A metal mold 3 shown in FIG. 7, for producing a wood type golf club head consists of upper and lower metal mold members 1, 2, and the upper metal mold member 1 is provided at the portion thereof which corresponds to a hosel of an object club head with a shaft pin 4 so that the shaft pin 4 which is formed integrally with the same mold member and used to form a club shaft fitting bore projects toward a sole of the lower metal mold member 2. However, since the shaft pin 4 in this metal mold 3 inclines greatly from the direction in which the upper and lower metal mold members 1, 2 are opened, it is difficult to remove a molded club head from the metal mold.

In view of the above, a metal mold 3 shown in FIG. 8 has been proposed. In this metal mold 3, a shaft pin 4 is formed independently of an upper metal mold member 1, and, when a molded product is removed from the mold 3, the shaft pin 4 is withdrawn therefrom after the upper metal mold member 1 has been opened, to solve the above-mentioned problem. However, in this metal mold, the position of the shaft pin 4 varies minutely due to the inner pressure thereof, so that the shaft bore positioning accuracy lowers. Especially, in the case of a club head having a short hosel, or, in the case of a no-hosel type club head in which a hosel is not provided at all, the upper end portion of a shaft bore demands a high molding accuracy but it is very difficult to achieve such a high molding accuracy by using this metal mold 3.

SUMMARY OF THE INVENTION

An object of the present invention is to provide a metal mold for producing a wood type golf club head, having an improved shaft bore molding accuracy.

Another object of the present invention is to provide a metal mold for producing a wood type golf club head, capable of improving an accuracy in molding an upper end portion of a shaft bore in, especially, a no-hosel wood type golf club head or a wood type golf club head having a very short hosel.

Still another object of the present invention is to provide a metal mold for producing a wood type golf club head, capable of removing a molded club head therefrom easily.

A metal mold for producing a wood type golf club head according to the present invention which achieves these objects comprises an upper metal mold member having a molding recess provided with a molding surface including a surface portion defining an upper end portion of a club head shaft bore, a lower metal mold member having a molding recess provided with a molding surface including a club head sole-defining surface portion, a shaft bore molding upper pin fitted firmly in the portion of the surface of the upper metal mold member which corresponds to an upper end portion of the shaft bore so as to project to the inner side of the metal mold, and a shaft bore molding lower pin fitted firmly in the lower metal mold member so as to project to the inner side of the metal mold, the upper and lower pins being arranged coaxially in an opposed state via a narrow clearance, the direction in which the upper and lower pins are arranged crossing perpendicularly the direction in which the joint surfaces of the upper and lower metal mold members extend.

According to the present invention, a shaft bore molding pin is thus divided into an upper pin fitted firmly in the upper metal mold member and a lower pin fitted firmly in the lower metal mold member, whereby the inner pressure imparted to the shaft pins during a molding operation is dispersed to enable the occurrence of minute variation of the positions of the shaft pins to be prevented, thereby improving a shaft bore positioning accuracy. This metal mold is very effectively used for molding, especially, a no-hosel wood type golf club head in which the upper end portion of a shaft bore demands a high molding accuracy for positioning the same properly, or a wood type golf club head having a very short hosel. Since a narrow clearance is provided between the upper and lower pins, a molding material can be introduced smoothly to the rear side of the shaft bore and the circumference of the upper end thereof, and the presence of stagnant air in the circumferential portion of the shaft bore can be minimized. Since the upper and lower pins are arranged so as to extend at right angles to the direction in which the joint surfaces of the upper and lower metal mold members extend, the removing of a molded product can be done very easily.

DESCRIPTION OF THE PREFERRED EMBODIMENTS

Figure 1:
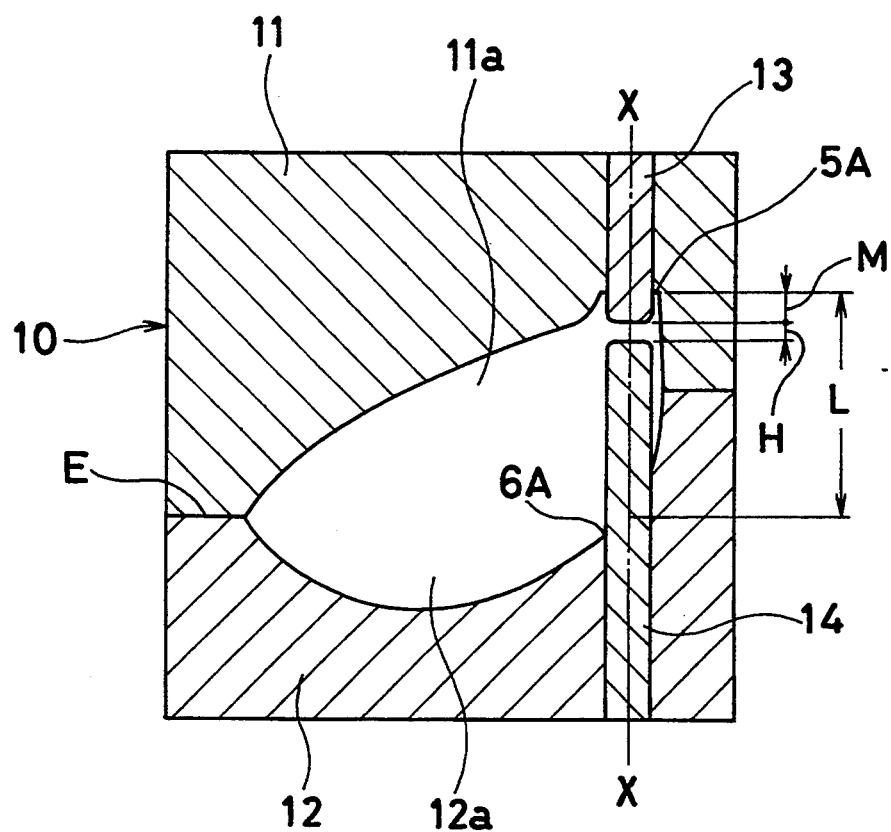
FIG. 1 is a sectional view of a metal mold for producing a wood type golf club head according to the present invention.

As shown in FIG. 1, a metal mold 10 for producing a wood type golf club head according to the present invention comprises an upper metal mold member 11 and a lower metal mold member 12. The upper metal mold member 11 has a molding recess 11a including a molding surface for an upper end portion 5a of a shaft bore 5 in a club head body Wa shown in FIG. 2. The lower metal mold member 12 has a molding recess 12a provided with a molding surface for a sole 6 of the club head body Wa. A columnar upper pin 13 for molding an upper portion of the shaft bore 5 is fitted firmly in upper end portion 5A of the molding recess 11a in the upper metal mold member 11 so as to project toward the sole 6. A columnar lower pin 14 for molding a lower portion of the shaft bore 5 is fitted firmly in a rear portion of a sole-molding surface 6A of the molding recess 12a in the lower metal mold member 12 so as to project toward the upper pin 13. The upper and lower pins 13, 14 are designed so that the upper pin 13 is shorter than the lower pin 14, and so that the pins 13, 14 extend on the same axis X-X in an opposed state with a narrow clearance between them, the axis X-X crossing at right angles to the joint surfaces E of the upper and lower metal mold members 11, 12.

Since a shaft bore-molding pin is thus divided into two, i.e. the upper pin 13 fitted firmly in the upper metal mold member 11 and the lower pin 14 fitted firmly in the lower metal mold member 12, the inner pressure applied to the shaft pins during a molding operation is dispersed to enable the variation of the positions of the shaft pins to be minimized, and the accuracy of positioning the shaft bore 5 to be improved. Since a narrow clearance is provided between the upper and lower pins 13, 14, the a molding material will flow smoothly and with ease to the rear side portion of the shaft bore 5 and the circumferential area of the upper end portion 5a thereof, so that the presence of stagnant air in the circumferential portion of the shaft bore 5 can be prevented. Since the upper and lower pins 13, 14 are arranged so as to extend at right angles to the joint surfaces E of the upper and lower metal mold members 11, 12, a molded product can be removed from the metal mold Very easily.

The upper pin 13 is made shorter than the lower pin 14, so that the accuracy of molding the upper end portion 5a of the shaft bore 5 can be improved. The length M of a projecting portion of the upper pin 13 is preferably set to a distance between 1 mm and less than ½ of a total length L of the shaft bore. The clearance H between the upper and lower pins 13, 14 is preferably in the range of 1–10 mm. More preferably, the length M of a projecting portion of the upper pin 13 is 5–10 mm, and the clearance H between the pins 13, 14 1–5 min.

Figure 3:
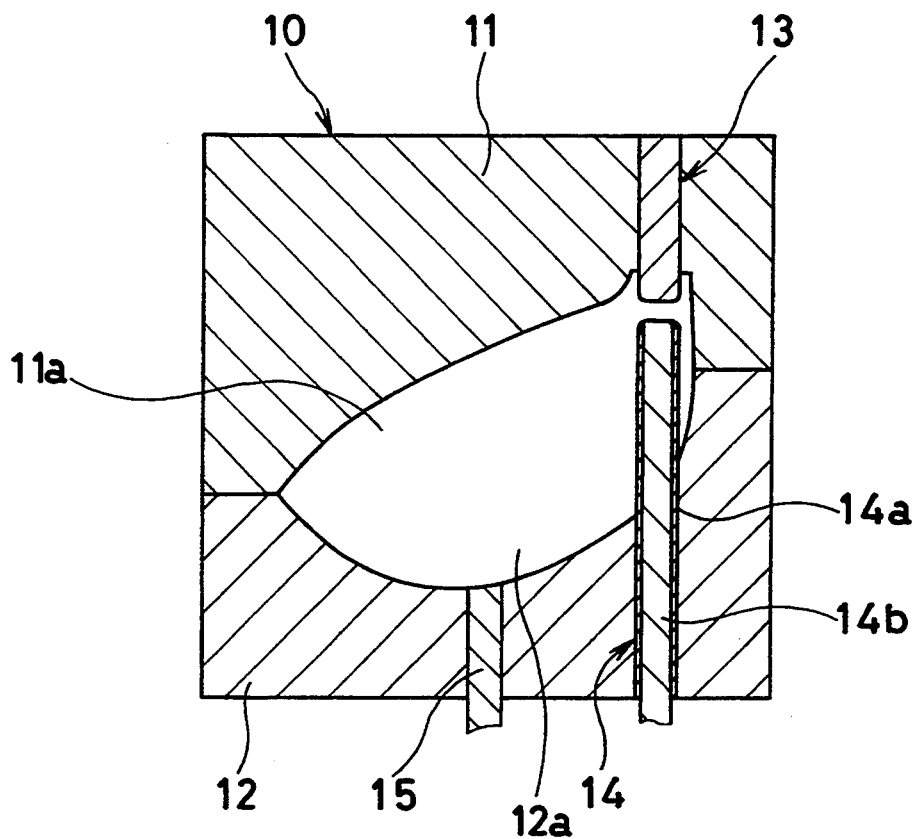
FIG. 3 is a sectional view of another metal mold for producing a wood type golf club head according to the present invention.

FIG. 3 shows another embodiment of the present invention, in which the lower pin 14 in the above-described metal mold 10 is formed by a tubular pin body 14a fitted firmly in the lower metal mold member 12, and a thrust pin 14b slidably fitted in the pin body 14a. Reference numeral 15 in the drawing denotes an existing thrust pin. It is clear that the metal mold in this embodiment has the same effect as the metal mold in the previously-described embodiment.

The molding of a wood golf club head W by using the metal mold 10 described above is done in the following manner.

Figure 4:
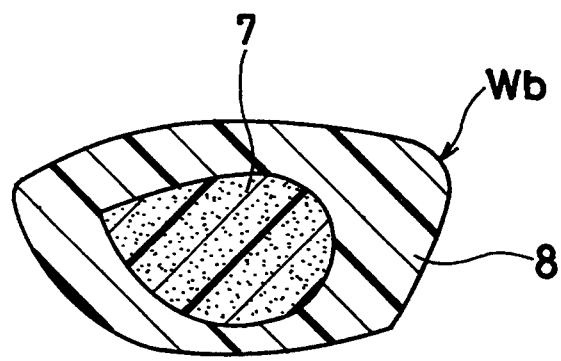
FIG. 4 is a sectional view of a molding body for a wood type golf club head to be produced by using the metal mold according to the present invention.

First, a club head molding body Wb shown in FIG. 4 and formed by covering a core 7 molded in advance with a prepreg 8 for molding an outer shell of a club head is set in the molding recess 12a in the above-described lower metal mold 12. The core 7 may be formed out of an expandable material, such as hard polyurethane and polystyrene foam, and syntactic foam formed by mixing glass microballons in a matrix resin. A weight member may be buried in the core 7. Any of the known synthetic resins can be used for forming the prepreg 8 for molding the outer shell of a club head.

The upper metal mold member 11 is then set on the lower metal mold member 12, and the molding body Wb is molded by heating. During this time, the inner pressure applied to the upper and lower shaft pins 13, 14 is divided accordingly to enable the minute variation of the positions of the shaft pins to be minimized. Moreover, the molding material flows smoothly in the circumferential portion of the shaft bore 5 via a narrow clearance provided between the upper and lower pins 13, 14 to enable the presence of stagnant air in the circumferential portion of the shaft bore 5 to be effectively minimized.

Figure 2:
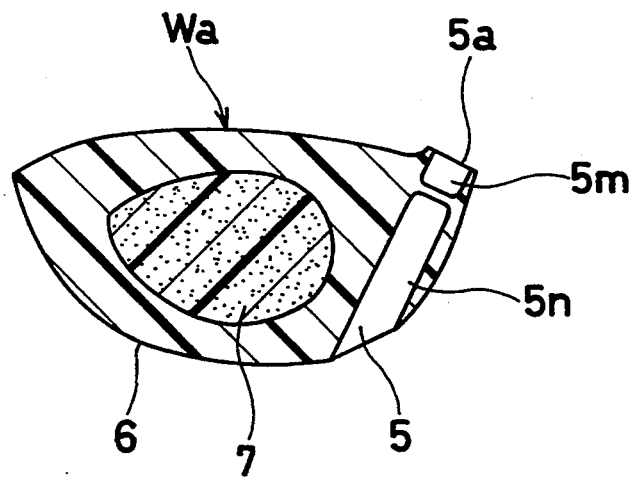
FIG. 2 is a sectional view of a club head body produced by using the metal mold of FIG. 1.

When the heating process has been completed, the molded product is removed from the metal mold to obtain a club head body Wa shown in FIG. 2. When the molded product is removed from the metal mold, the upper metal mold member 11 can be separated perpendicularly with respect to the lower metal mold member 12. Accordingly, the molded product can be removed from the metal mold very easily.

Figure 5:
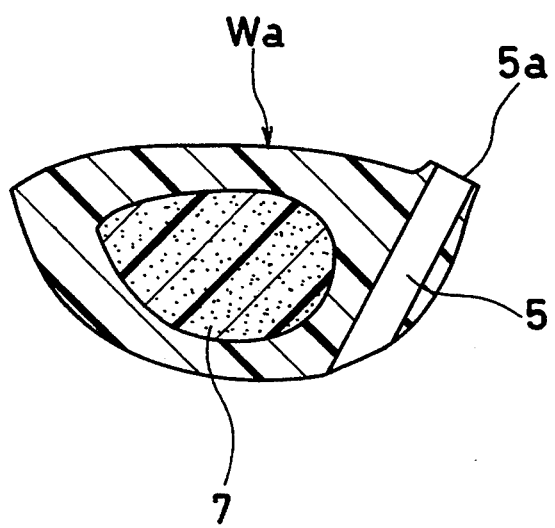
FIG. 5 is a sectional view of the club head body of FIG. 2 through which a shaft bore is formed.
Figure 6:
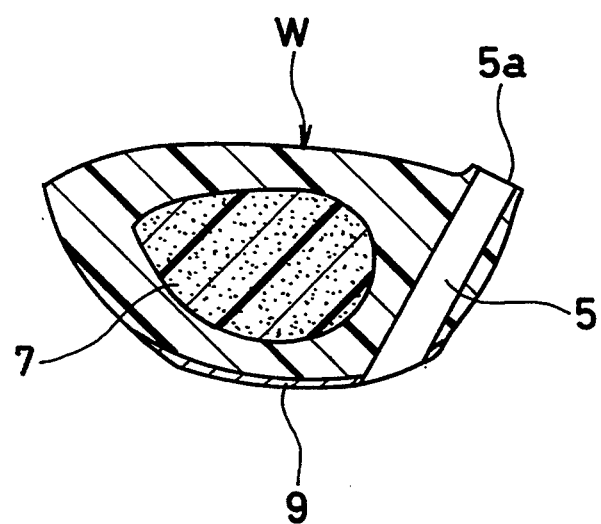
FIG. 6 is a sectional view of a wood type golf club head produced by using the metal mold according to the present invention.
Figure 7:
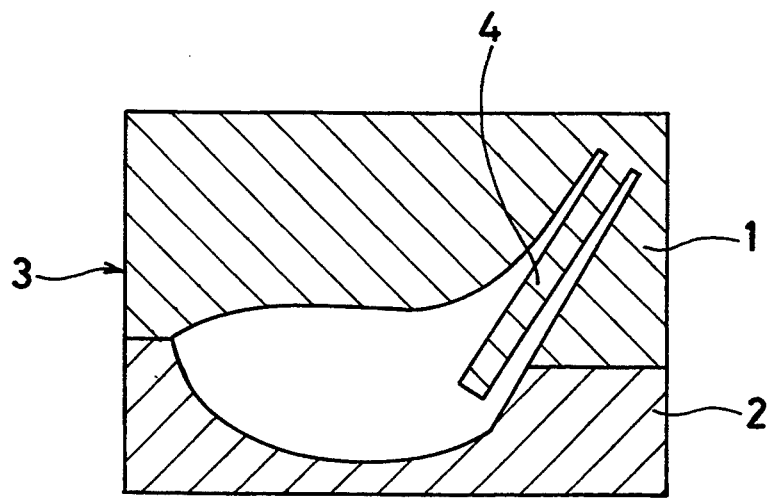
FIG. 7 is a sectional view of a conventional metal mold of this kind.
Figure 8:
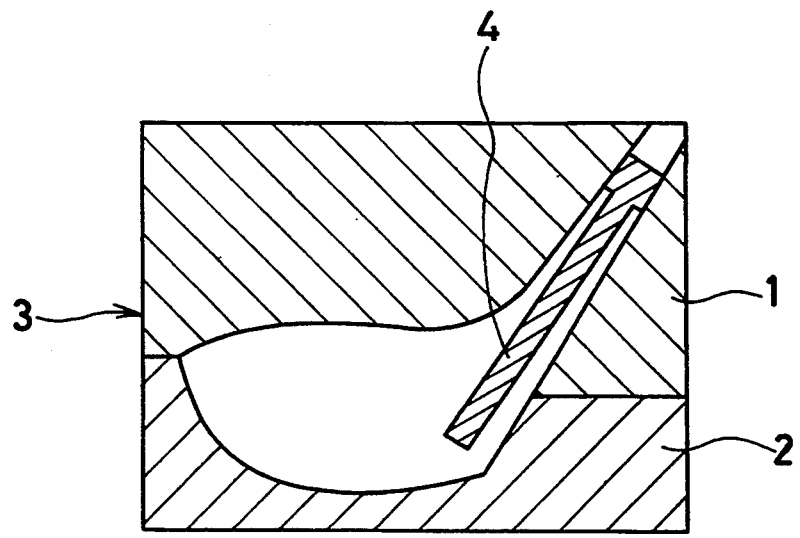
FIG. 8 is a sectional view of another conventional metal mold of this kind.

The upper and lower shaft bores 5m, 5n in the club head body Wa are then subjected to a machining process using a machining tool, such as a drilling machine, to form a club head body Wa having a through shaft bore 5 as shown in FIG. 5. A sole plate 9 is then attached to the sole 6 to obtain a wood type golf club head W as shown in FIG. 6.

When the metal mold 10 shown in FIG. 3 is used, the air can be discharged from the clearance between the pin body 14a and thrust pin 14b to the outside during the molding of the club head body Wa. Therefore, presence of the stagnant air in the circumferential portion of the upper end portion 5a of the shaft bore 5 is effectively prevented to enable the quality and accuracy of the molded product to be further improved. The excess molding material entering and left in the clearance between the pin body 14a and thrust pin 14b can be removed easily during the upward insertion of the thrust pin 14b.

The above embodiments are described in connection with the compression molding of a club head. It is needless to say that the metal mold according to the present invention can also be used for the injection molding of a club head.

As described above, in the metal mold for producing a wood type golf club head according to the present invention, a shaft bore-molding pin is divided into two, i.e. an upper pin fitted firmly in an upper metal mold member and a lower pin fitted firmly in a lower metal mold member. Therefore, the inner pressure applied to the shaft pins during a molding operation is divided accordingly. This enables minute variations of the positions of the shaft pins to be prevented, and the shaft bore positioning accuracy to be improved. This metal mold is very effective for molding, especially, a no-hosel type wood golf club head in which the molding of an upper end portion of a shaft bore demands a high accuracy, or a wood type golf club head having a very short hosel. Since a narrow clearance is provided between the upper and lower pins, the molding material flows smoothly in the rear side portion of a shaft bore and the circumference of the upper end portion of the shaft bore, so that the presence of stagnant air in the circumferential portion of the shaft bore can be minimized. Since the upper and lower pins are arranged so as to extend at right angles to the joint surfaces of the upper and lower metal mold members, the removal of the molded product after the completion of the molding operation can be done very easily.

What is claimed is:

1. A method of producing a golf club head having a shaft bore for receipt of a golf club shaft, comprising the steps of providing a metal mold consisting of an upper metal mold member having a mold joint surface and a molding recess including a surface for molding an upper side of a club head, a lower metal mold member having a mold joint surface and a molding recess including a surface for molding a sole of said club head, said upper and lower metal mold members being joinable along their mold joint surfaces to form said metal mold having an interior space therein, a shaft bore-molding upper pin fitted firmly in a portion of the molding surface of said upper metal mold member which corresponds to an upper end portion of said shaft bore, said upper pin projecting toward the interior space of said metal mold, and a shaft bore-molding lower pin fitted firmly in a portion of the molding surface of said lower metal mold member which corresponds to a lower end portion of said shaft bore, said lower pin projecting beyond said molding surface of said lower metal mold member and toward the interior space of said metal mold, said upper and lower pins being arranged coaxially in an opposed state with a narrow clearance between their opposed ends and together forming said shaft bore of the club head, said upper and lower pins being perpendicular to the direction of the mold joint surfaces of said upper and lower metal mold members; placing a club head molding body, formed by covering a core molded in advance with a prepreg, in said molding recess in said lower metal mold member; setting said upper metal mold member on said lower metal mold member so that the mold joint surfaces mate, heating said metal mold to mold said club head molding body into a molded club head body having upper and lower shaft bore portions therein corresponding to said upper and lower pins, removing the molded club head body from said metal mold; machining said molded club head body so as to remove material molded between the upper and lower shaft bore portions thereby connecting them together and forming said shaft bore; and attaching a sole plate to the sole of said club head body.

2. A metal mold for producing a golf club head having a shaft bore for receipt of a golf club shaft, said metal mold comprising an upper metal mold member having a mold joint surface and a molding recess including a surface for molding an upper side of a club head, a lower metal mold member having a mold joint surface and a molding recess including a surface for molding a sole of said club head, said upper and lower metal mold members being joinable along their mold joint surfaces to form said metal mold having an interior space therein, a shaft bore-molding upper pin fitted firmly in a portion of the molding surface of said upper metal mold member which corresponds to an upper end portion of said shaft bore, said upper pin projecting beyond said molding surface of said upper metal mold member and toward the interior space of said metal mold, and a shaft bore-molding lower pin fitted firmly in a portion of the molding surface of said lower metal mold member which corresponds to a lower end portion of said shaft bore, said lower pin projecting beyond said molding surface of said lower metal mold member and toward the interior space of said metal mold, said upper and lower pins being arranged coaxially in an opposed state with a narrow clearance between their opposed ends and together forming said shaft bore of the club head and being perpendicular to the direction of the mold joint surfaces of said upper and lower metal mold members, said lower pin comprising a tubular pin body fitted firmly in said lower metal mold member and a thrust pin fitted slidably in said pin body.

3. The metal mold of claim 2, wherein the upper pin is shorter in length than the lower pin.

4. The metal mold of claim 3, wherein the length of the portion of said upper pin that projects beyond said molding surface of said upper metal mold member is from 1 mm to less than $\frac{1}{2}$ of the total length of said shaft bore in said club head.

5. The metal mold of claim 2, wherein said clearance between the opposed ends of said upper and lower pins is from 1 to 10 mm.

6. The metal mold of claim 2, wherein the upper pin projects beyond said molding surface of said upper metal mold member a distance of from 5 to 10 mm and said clearance between the opposed ends of said upper and lower pins is from 1 to 5 mm.

* * * * *